(12) United States Patent
Rosebush

(10) Patent No.: US 7,839,284 B2
(45) Date of Patent: Nov. 23, 2010

(54) MONITORING OF SHOPPING CART BOTTOM TRAY

(75) Inventor: Paul Smith Rosebush, Etobicoke (CA)

(73) Assignee: Oossite Technologies Inc., Ottawa, Ontario (CA)

( * ) Notice: Subject to any disclaimer, the term of this patent is extended or adjusted under 35 U.S.C. 154(b) by 290 days.

(21) Appl. No.: 11/973,028

(22) Filed: Oct. 5, 2007

(65) Prior Publication Data

US 2008/0088444 A1 Apr. 17, 2008

Related U.S. Application Data

(60) Provisional application No. 60/828,559, filed on Oct. 6, 2006.

(51) Int. Cl.
 *G08B 13/14* (2006.01)
 *G06K 15/00* (2006.01)
(52) U.S. Cl. .................. 340/568.5; 340/568.1; 235/383
(58) Field of Classification Search .............. 340/568.5; 235/383
See application file for complete search history.

(56) References Cited

U.S. PATENT DOCUMENTS

| | | | | |
|---|---|---|---|---|
| 4,071,740 A * | 1/1978 | Gogulski | ..................... | 235/431 |
| 4,327,819 A | 5/1982 | Coutta | | |
| 4,338,594 A | 7/1982 | Holm | | |
| 4,723,118 A | 2/1988 | Hooley | | |
| 4,736,098 A | 4/1988 | Rehrig | | |
| 4,882,567 A * | 11/1989 | Johnson | ....................... | 340/522 |
| 5,485,006 A | 1/1996 | Allen | | |
| 5,495,102 A | 2/1996 | Fine | | |
| 5,500,526 A | 3/1996 | Shalvi | | |
| 5,610,584 A | 3/1997 | Schrade | | |
| 5,836,596 A * | 11/1998 | Wanzl | ................... | 280/33.991 |
| 5,883,968 A | 3/1999 | Welch | | |
| 5,910,769 A | 6/1999 | Geisler | | |
| 6,201,473 B1 | 3/2001 | Schaffer | | |
| 6,384,739 B1 * | 5/2002 | Roberts, Jr. | .................. | 340/905 |
| 6,435,407 B1 * | 8/2002 | Fiordelisi | .................... | 235/383 |
| 6,484,939 B1 * | 11/2002 | Blaeuer | ....................... | 235/383 |
| 6,542,079 B1 | 4/2003 | Kahl | | |
| 6,741,177 B2 | 5/2004 | Ballantyne | | |
| 7,242,300 B1 * | 7/2007 | Konstad et al. | .......... | 340/568.5 |
| 7,364,070 B2 * | 4/2008 | Chang | ......................... | 235/383 |
| 7,449,996 B2 * | 11/2008 | Hill | ............................. | 340/457 |
| 2004/0193313 A1 * | 9/2004 | Cornet et al. | ............... | 700/231 |
| 2004/0252025 A1 * | 12/2004 | Silverbrook et al. | ..... | 340/568.5 |
| 2005/0189412 A1 | 9/2005 | Hudnut | | |
| 2006/0032914 A1 | 2/2006 | Brewster | | |
| 2006/0283943 A1 | 12/2006 | Ostrowski | | |

FOREIGN PATENT DOCUMENTS

CA 2088894 8/1994

(Continued)

*Primary Examiner*—Benjamin C Lee
*Assistant Examiner*—Andrew Bee
(74) *Attorney, Agent, or Firm*—Kagan Binder, PLLC

(57) ABSTRACT

A detection device is provided for alerting a cashier to the presence of an object located on the lower tray of a shopping cart. The detection device uses a combination of a weight sensor and a presence sensor to trigger a signal, all of which are mounted on the cart. The signal is positioned so as to be visible by the user of the cart and store personnel.

14 Claims, 3 Drawing Sheets

FOREIGN PATENT DOCUMENTS

| | | |
|---|---|---|
| CA | 2174249 | 4/1995 |
| CA | 2175635 | 11/1996 |
| CA | 2154815 | 1/1997 |
| CA | 2423205 | 9/2003 |
| CA | 2476968 | 2/2006 |

* cited by examiner

MONITORING OF SHOPPING CART BOTTOM TRAY

PRIORITY CLAIM

The present non-provisional patent Application claims benefit from U.S. Provisional Patent Application having Ser. No. 60/828,559, filed on Oct. 6, 2006, by Rosebush and titled MONITORING OF SHOPPING CART BOTTOM TRAY, wherein the entirety of said provisional patent application is incorporated herein by reference.

FIELD OF THE INVENTION

The invention relates to a detection system for objects in the storage space of shopping carts.

BACKGROUND OF THE INVENTION

Since the development of the modern-day shopping cart, unpaid product has inadvertently exited the retail grocery store via the lower tray of the shopping cart. The reason for this is that as a customer's shopping cart reaches the point-of-sale checkstand, the cashier's view of the lower tray is obstructed by the checkstand; thus, the customer is, in most cases, innocently and unwittingly permitted to exit the premises without declaring the product. Though this flaw is exploited by the dishonest, the more significant problem is the inadvertent error.

A thorough study of this point-of-sale design flaw estimates that the average loss to the retail grocery industry is 85% of the product stored on the lower tray of a shopping cart. The obvious solution might be to simply remove this lower tray; however, the lower tray represents considerable extra revenue by allowing the storage of bulk items such as dog food or cases of soda. Without the lower tray, customers are reluctant to place bulk items in the basket.

Occasionally, the cashier or another store employee may spot the product in the bottom tray after the checkout has been completed. In order to remedy the situation after checkout, the cashier would have to verbally confront the customer. This is potentially embarrassing to both the cashier and the customer, and delays the checkout process. In light of this, cashiers will often not stop a customer after the checkout has been completed for this purpose.

Over the last thirty-five years several systems have been designed and tested in the field. Previous technologies applied in an effort to eliminate this problem used various configurations and components ranging from mirrors and watchers (employees hired to actively watch the lower tray) to infrared sensors with reflectors and shopping cart mounted mechanical linkage devices. Due to the inflexibility and inaccuracy of earlier designs and methods, a true working system was never realized.

Generally speaking, the detection of something on the bottom tray may be described as activation, as it represents the activation of the system in response to something. True activation occurs when the cashier is alerted by the device to the presence of items on the lower tray and requests the customer declare the forgotten items before the financial transaction is completed. This is a desired function of the invention. False activation occurs when the alert triggering mechanism is triggered by something other than the presence of an object on the bottom tray of the shopping cart. It is desirable to minimize or eliminate altogether the number of false activations, giving the cashier confidence in the system and avoiding the embarrassing situation where the cashier asks the customer for the items on the bottom tray when in fact there is nothing on the bottom tray. Non-activation occurs when the intended target is present but not detected.

To date, technologies and applications thereof attempting to eliminate this problem have had limited success for a variety of reasons including variations in shopping cart design or checkstand design, variations in traffic flow at the point of sale, problems with type of technology being used, and the lack of full attention on the part of the cashier.

There have been a number of systems that detected weight on the bottom tray and then activated a signal, but these inventions have either proved unreliable, or have been easily circumvented by inserting an object into the mechanical workings of the system, thereby preventing the activation of the signal.

Large objects have also posed problems for earlier detection systems. On a typical shopping cart, the existing lower tray, in the seated position, rests degraded to the rear of the cart to prevent objects from rolling or sliding off the lower tray in the event of a sudden stop. As a result, the cart's frame, with the tray in the seated or empty state, is the highest point. If an object is large enough, it can straddle the frame without actually touching the lower tray thus defeating these earlier systems.

SUMMARY OF THE INVENTION

On a shopping cart having a tray and a frame, the invention provides a product detection system comprising:
  a) a weight sensor, affixed to the tray,
  b) a presence sensor, located on the frame and directed at the tray,
  c) a signal, located visibly on the shopping cart,
  wherein the signal activates only when both the weight sensor and the presence sensor are activated.

The presence sensor may include one or a combination of: beam radiation, such as infrared, microwave, or optical beam radiation; and ultrasonic waves, in conjunction with ceramic or piezoelectric components.

The weight sensor may include one or a combination of: piezomechanical plates, pressure strips, strain gauge sensors, resistive type bend sensors, mechanical spring/scale assemblies, and magnetic scales.

DETAILED DESCRIPTION

Figure 1:
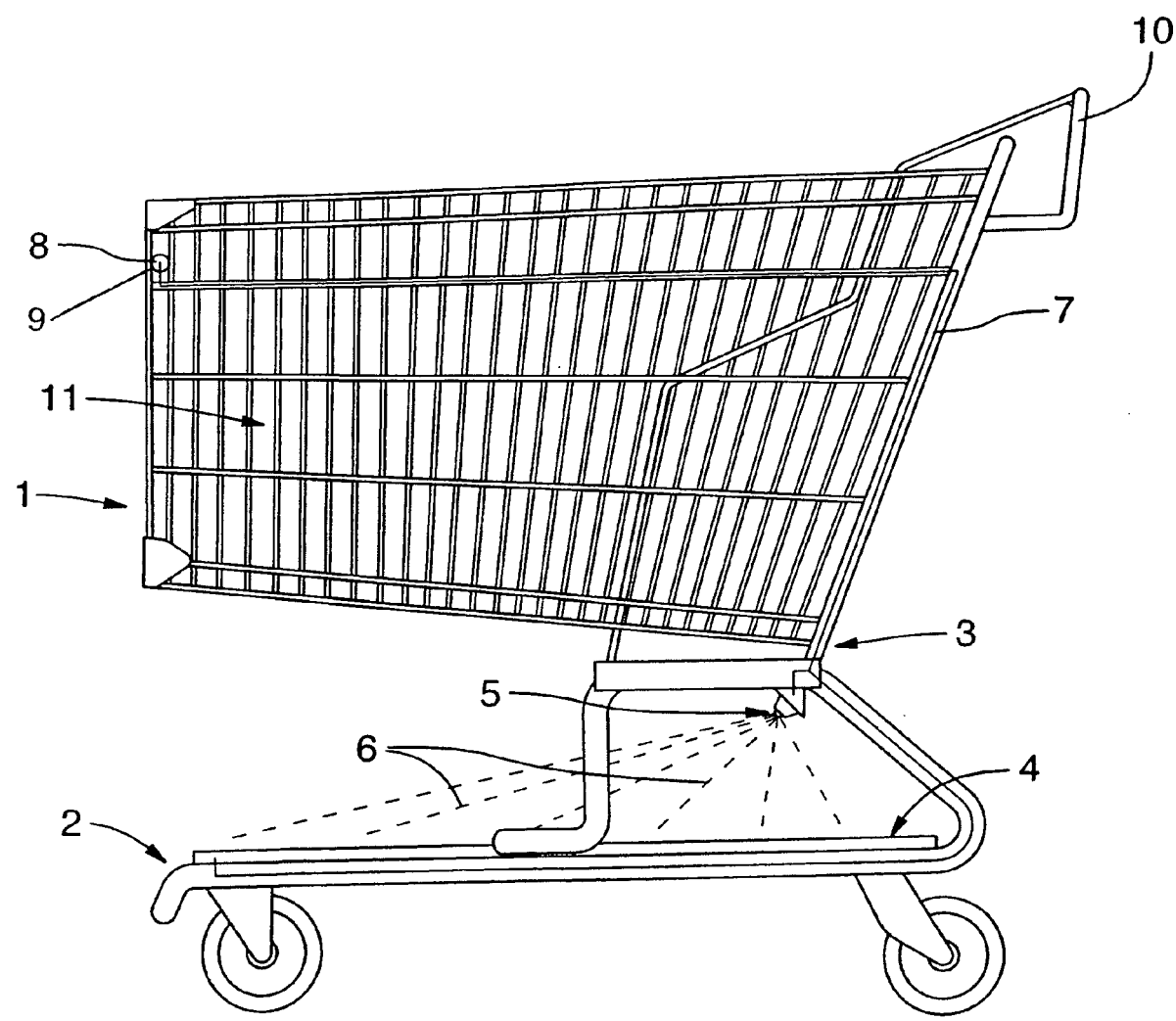
FIG. 1 is a side view of the system according to a first embodiment.

In the first embodiment shown in FIG. 1, a shopping cart 1 having a tray 2 and a basket 11 attached to a frame 3 may be fitted or retrofitted with a weight sensor 4, an infrared sensor 5, and a signal 8. When an object is placed on the tray 2, the weight sensor 4 may be activated, and the infrared beam 6 may be disrupted, thereby activating the infrared sensor 5. When both the weight sensor 4 and the infrared sensor 5 are activated, the signal 8 is also activated, visually alerting all those around the shopping cart 1 that the tray 2 contains an object.

A wiring harness 7 may be used to electrically connect the weight sensor 4 and the infrared sensor 5 to the signal 8 and to a controller 9.

The controller 9 may be mounted on the handlebar 10, or mounted anywhere on or within the frame 3, or housed within the signal 8, the infrared sensor 5, or the weight sensor 4.

Preferably, the controller 9 may contain a solar cell to power the system, and may comprise an embedded electronic processor. The controller 9 may be used to check the state of the weight sensor 4 and infrared sensor 5, and may generate the power to energize the signal 8 when both the weight sensor 4 and infrared sensor 5 are activated, and may reset the signal 8 upon the deactivation of either the weight sensor 4 or the infrared sensor 5. The controller 9 may be used for power management, and may assist in diagnosing a failure of the system.

The infrared sensor 5 may be an active pulsed retro-reflective infrared sensor used to detect an object on the tray 2. In the first embodiment, the infrared sensor 5 may not power up until the weight sensor 4 is activated by the presence of an object on the tray 2.

The infrared sensor 5 may be replaced with any other form of presence sensor that does not require physical contact to be activated, such as a microwave sensor, an optical sensor, or an ultrasonic sensor. The presence sensor may be positioned so as to detect the presence of an object on the bottom tray 2. The infrared sensor 5 may be replaced with a number of presence sensors, of the same or of differing technologies, to detect the presence of an object on the bottom tray 2.

Preferably, the weight sensor 4 comprises one or more durable pressure plate switches embedded in a durable material. Alternatively, the weight sensor 4 may comprise one, a number, or a combination of piezomechanical plates, pressure strips, strain gauge sensors, resistive type sensors, mechanical spring/scale assemblies, or magnetic scales. The tray 2 and the weight sensor 4 may be integrated into the same housing.

The signal 8 may be positioned anywhere on the cart, as long as it is readily visible to the cashier or other individuals in the store, and will depend on the structure of the cart. Preferably, the signal 8 is positioned on the inside of the basket 11 at the front of the cart 1. This position on a typical shopping cart is not normally physically contacted during the process of stacking carts, so it is in an advantageous position for placing the signal 8 to prevent damage during stacking. The signal is illuminated only when an object rests on the weight sensor 4 while interrupting the infrared sensor beam 6.

Figure 2:
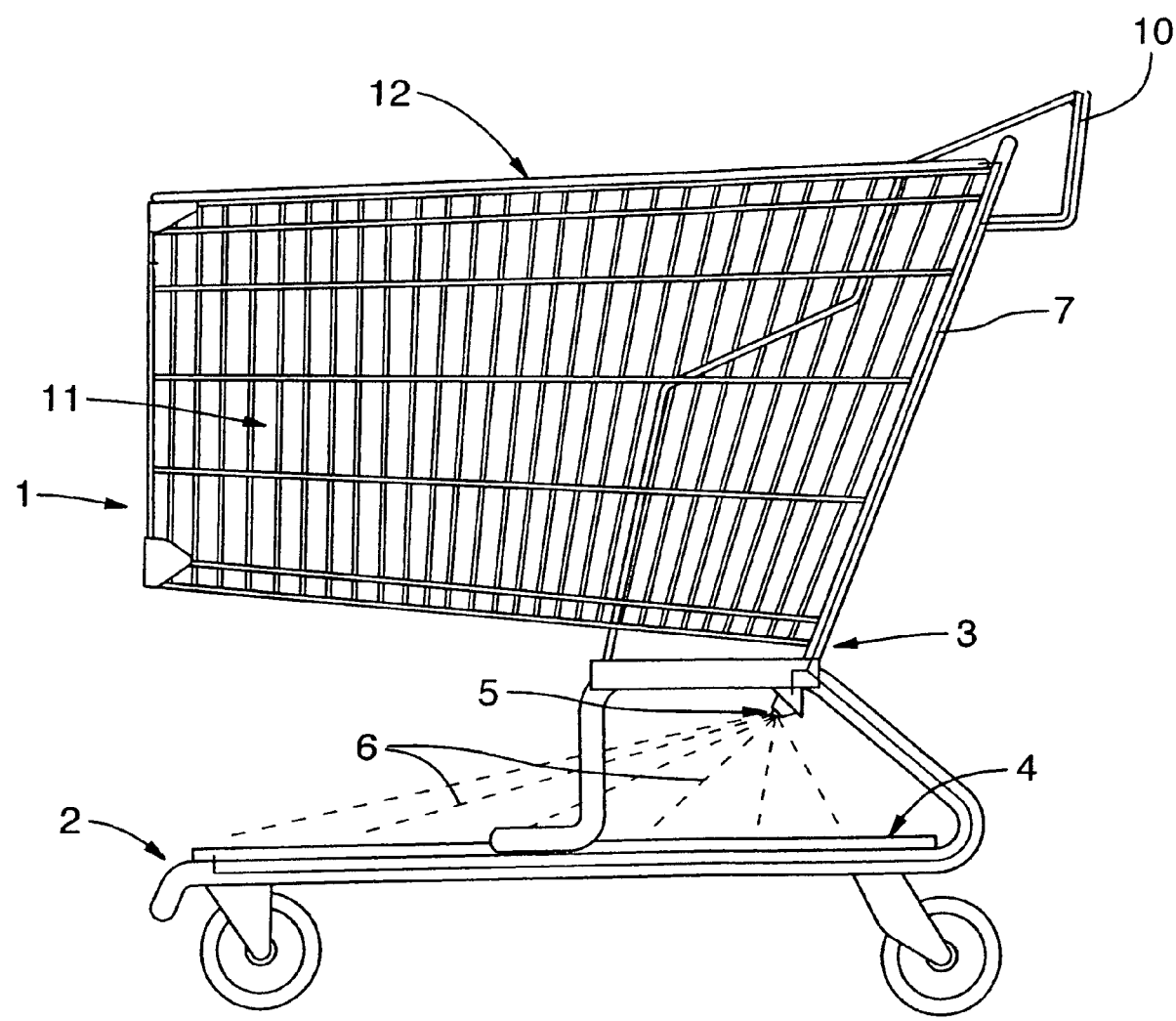
FIG. 2 is a side view of the system according to a second embodiment.

In a second embodiment shown in FIG. 2, a signal 12 may be a frosted acrylic rod that runs along one top edge of the basket 11, and the rod may be illuminated by a concealed super-bright light-emitting diode.

Figure 3:
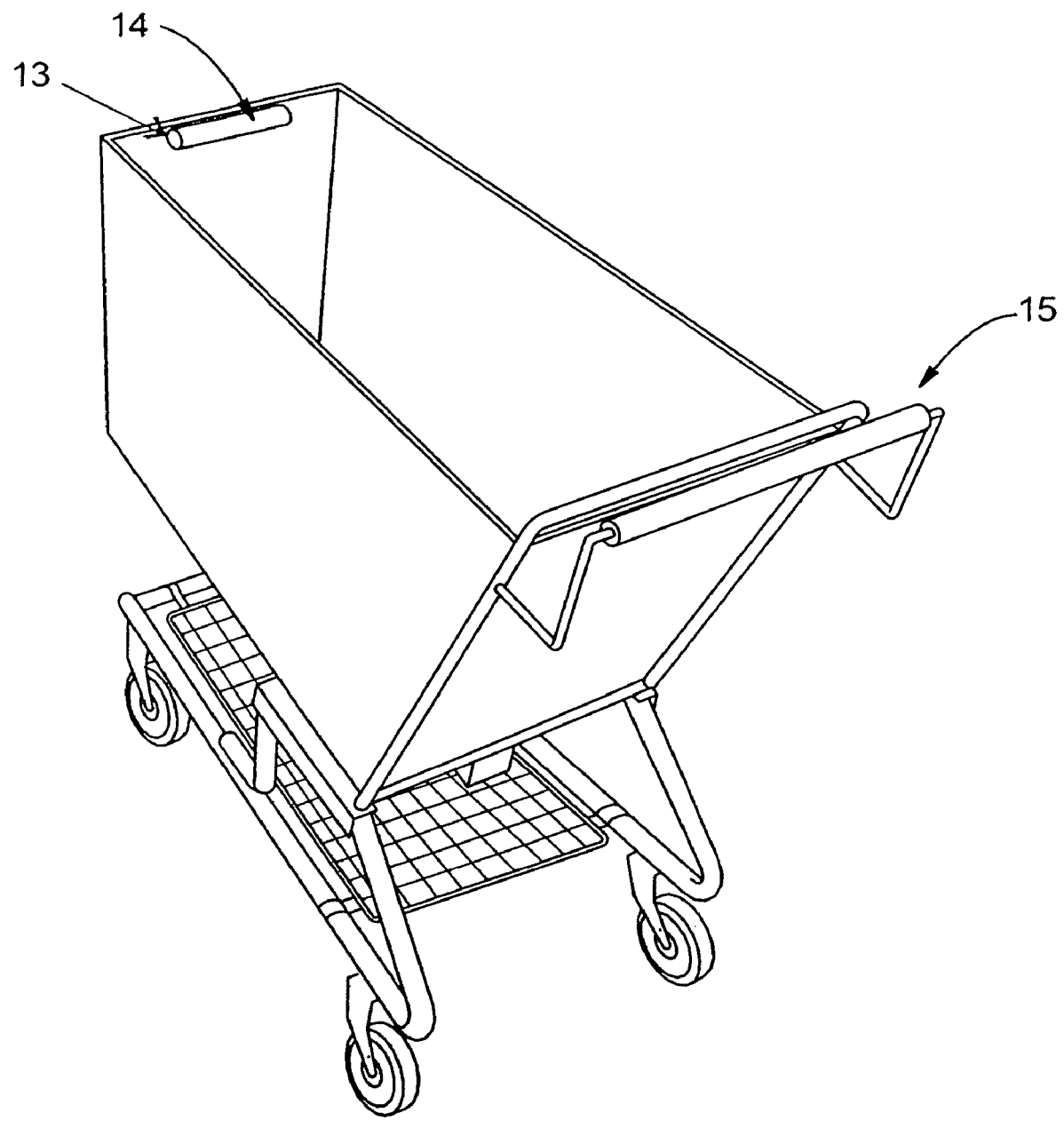
FIG. 3 is a perspective view of the signal and controller according to a third embodiment.

In a third embodiment shown in FIG. 3, a signal 13 and a controller 14 may be integrated into the same housing, and mounted on the inside of the basket 11 at the front of the cart 1. In this embodiment, the handle 15 of the cart is located at the back of the cart.

In a fourth embodiment, a presence sensor may take the form of piezoelectrical or pressure sensor mounted on those potions of the frame 3 immediately adjacent to the bottom tray 2 oriented upwards, so that large items that overhang the tray and rest on the frame are detected. This presence sensor may be a strip of material that extends all around those portions of the frame immediately adjacent to the tray 2. In this embodiment, the signal is activated when either the weight sensor 4 or the presence sensor is activated, or when both are activated.

The invention may be fitted or retrofitted to any shopping cart design, including those which have two baskets or trays, stacked directly or offset from one another relative to the frame. The invention may be adapted to place a weight sensor and an infrared sensor on each tray or only on those closest to the ground.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. A product detection system for a shopping cart having a tray and a frame, the product detection system comprising:
   a. a weight sensor, affixed to the tray, for sensing the weight of a product on the tray,
   b. a presence sensor, located on the frame and directed at the tray, for sensing the presence of the product on the tray,
   c. a signal, visibly located on the shopping cart,
   wherein the signal activates when the weight sensor or the presence sensor are activated, and wherein the signal remains activated so long as either the weight sensor, the presence sensor, or both are activated, and deactivates otherwise, and
   wherein the presence sensor comprises at least one pressure sensitive strip mounted on those portions of the frame immediately adjacent to the tray, the at least one pressure sensitive strip mounted with any pressure sensitive surfaces facing upwards, and wherein the activation of the at least one pressure strip activates the presence sensor.

2. The product detection system of claim 1, wherein the presence sensor comprises a plurality of presence sensors, and wherein the activation of any one of the plurality of presence sensors activates the presence sensor.

3. The product detection system of claim 1, wherein the weight sensor comprises one or a combination of: piezomechanical plates, pressure strips, strain gauge sensors, resistive type bend sensors, and magnetic scales, and wherein the weight sensor is activated when a product is placed on the weight sensor.

4. The product detection system of claim 1 further comprising a wiring harness for connecting the weight sensor and the presence sensor to the signal.

5. The product detection system of claim 1 wherein the cart also comprises a basket, and the signal is located at the front of the cart mounted on the inside of the basket.

6. The product detection system of claim 1 further comprising:
   a controller for detecting the activation of the weight sensor and the presence sensor and for activating the signal, and
   a power source.

7. The product detection system of claim 6 wherein the power source is a solar cell.

8. The product detection system of claim 6 wherein the controller manages the power source.

9. The product detection system of claim 6 wherein the controller monitors the state of the system and assists in diagnosing failures by providing system information.

10. The product detection system of claim 1 retrofitted to an existing cart.

11. The product detection system of claim 1 fitted to a new cart.

12. The product detection system of claim 6 retrofitted to an existing cart.

13. The product detection system of claim 6 fitted to a new cart.

14. The product detection system of claim 1 wherein the cart also comprises a basket, and the signal is located along one top edge of the basket.

* * * * *